(12) United States Patent
Park

(10) Patent No.: US 12,523,269 B2
(45) Date of Patent: Jan. 13, 2026

(54) ELECTRONIC PARKING BRAKE SYSTEM AND CONTROL METHOD THEREOF

(71) Applicant: HL MANDO CORPORATION, Pyeongtaek-si (KR)

(72) Inventor: Jaehyun Park, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 459 days.

(21) Appl. No.: 17/983,581

(22) Filed: Nov. 9, 2022

(65) Prior Publication Data

US 2023/0145033 A1     May 11, 2023

(30) Foreign Application Priority Data

Nov. 9, 2021    (KR) ........................ 10-2021-0153354

(51) Int. Cl.
| | | |
|---|---|---|
| *F16D 65/22* | (2006.01) | |
| *F16D 121/04* | (2012.01) | |
| *F16D 121/24* | (2012.01) | |
| *F16D 123/00* | (2012.01) | |
| *F16D 125/04* | (2012.01) | |

(52) U.S. Cl.
CPC .......... *F16D 65/22* (2013.01); *F16D 2121/04* (2013.01); *F16D 2121/24* (2013.01); *F16D 2123/00* (2013.01); *F16D 2125/04* (2013.01)

(58) Field of Classification Search
CPC .. F16D 65/22; F16D 2121/24; F16D 2125/40; B60T 13/741
See application file for complete search history.

(56) References Cited

U.S. PATENT DOCUMENTS

| | | | |
|---|---|---|---|
| 2012/0245816 A1* | 9/2012 | Blattert | F16D 65/12 |
| | | | 701/70 |
| 2014/0058642 A1* | 2/2014 | Bieltz | B60T 7/12 |
| | | | 701/70 |
| 2015/0120163 A1* | 4/2015 | Ohara | B60T 7/108 |
| | | | 701/70 |

(Continued)

FOREIGN PATENT DOCUMENTS

| | | |
|---|---|---|
| DE | 10361042 B3 | 5/2005 |
| DE | 102004004992 A1 | 9/2005 |

(Continued)

OTHER PUBLICATIONS

Machine translation of WO 2020/090706 (no date).*
Office Action from German Patent Office, dated Oct. 8, 2024.
DE office action dated Jun. 24, 2025.

*Primary Examiner* — Nicholas J Lane
(74) *Attorney, Agent, or Firm* — Harvest IP Law, LLP

(57) ABSTRACT

Disclosed is an electronic parking brake system includes: an electronic parking brake having an electric motor and a hydraulic cylinder; an ESC actuator configured to generate and supply hydraulic pressure to the hydraulic cylinder; and a controller configured to control the electric motor and the ESC actuator. The controller determines whether or not the electronic parking brake is normally releasable based on the temperature of the electronic parking brake when parking is released, and controls the electric motor to supply hydraulic pressure to the hydraulic cylinder via the ESC actuator and start parking release control when normal release is not possible.

10 Claims, 7 Drawing Sheets

(56) References Cited

U.S. PATENT DOCUMENTS

2015/0145321 A1* 5/2015 Yuasa .................... B60T 8/172
                                                                              303/3
2025/0206274 A1* 6/2025 Yamamoto ............. B60T 8/171

FOREIGN PATENT DOCUMENTS

| | | | |
|---|---|---|---|
| DE | 102011005843 A1 | | 9/2012 |
| JP | 2009-067264 A | | 4/2009 |
| KR | 10-2010-0101890 A | | 9/2010 |
| WO | WO-2020090706 A1 | * | 5/2020 |

* cited by examiner

[FIG. 1]
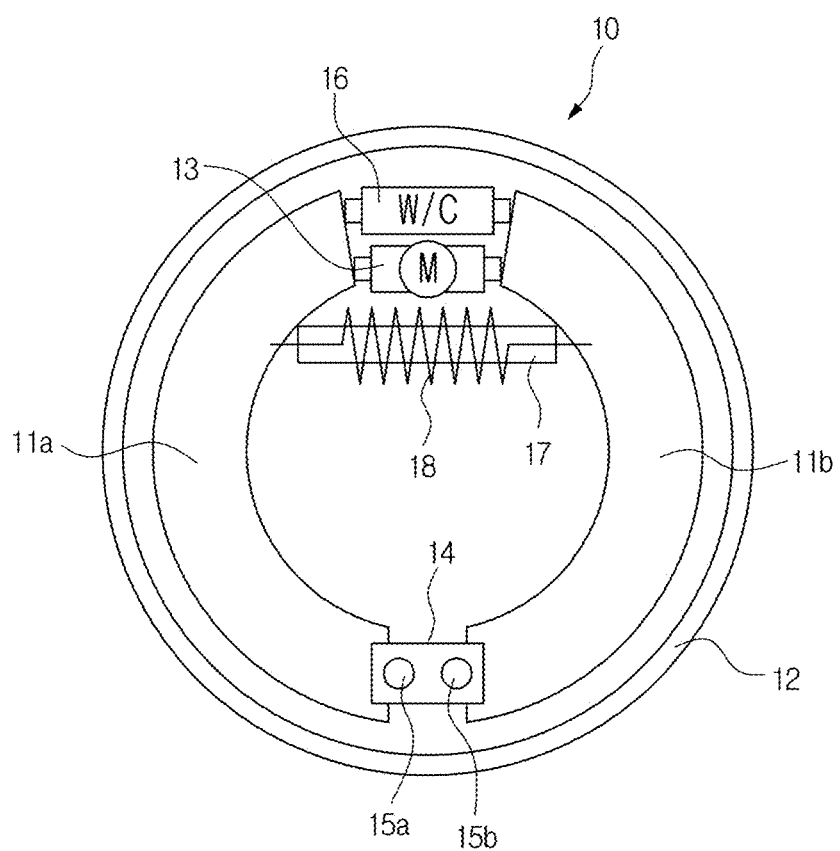

[FIG. 2]
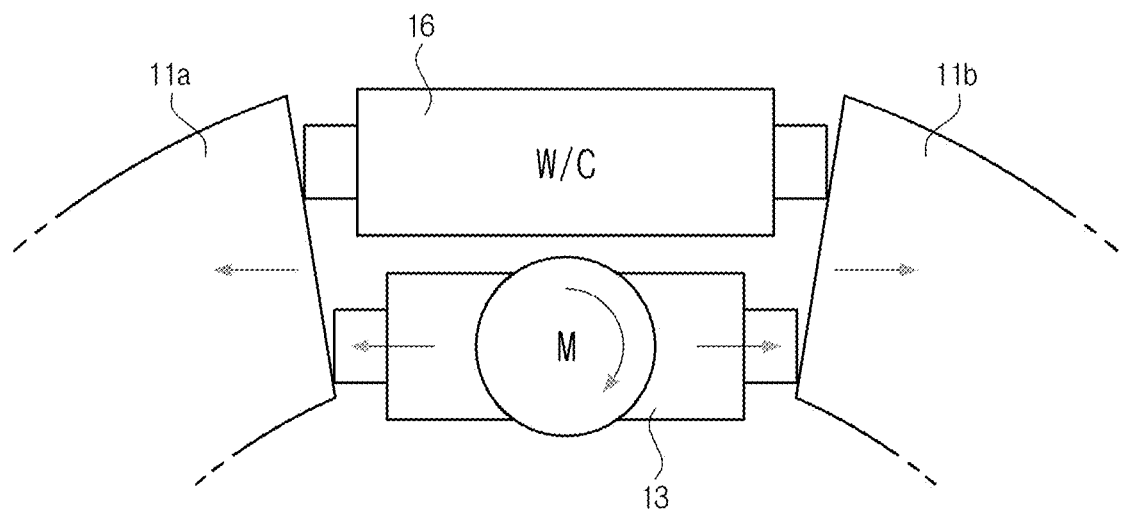

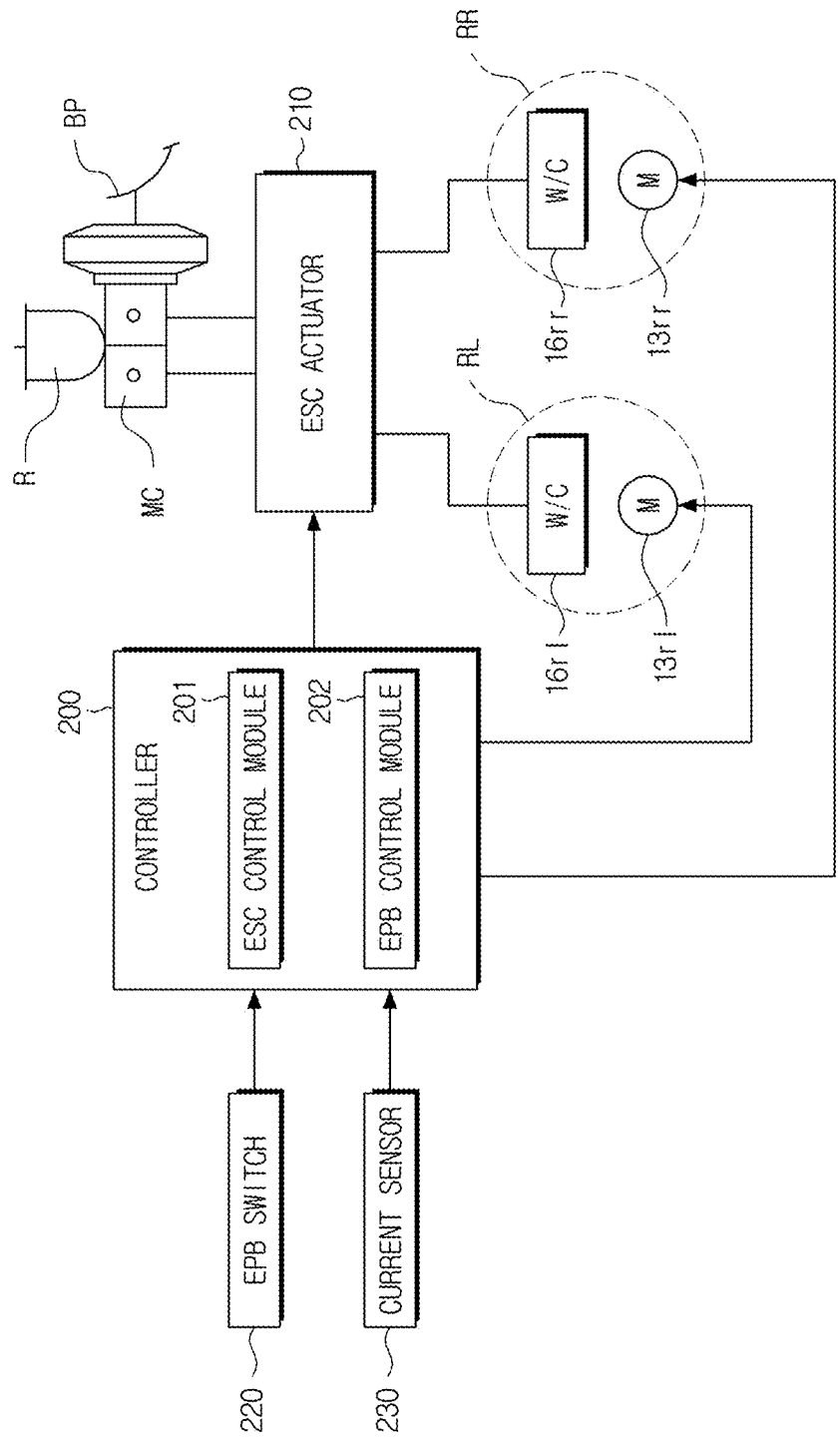

[FIG. 4]
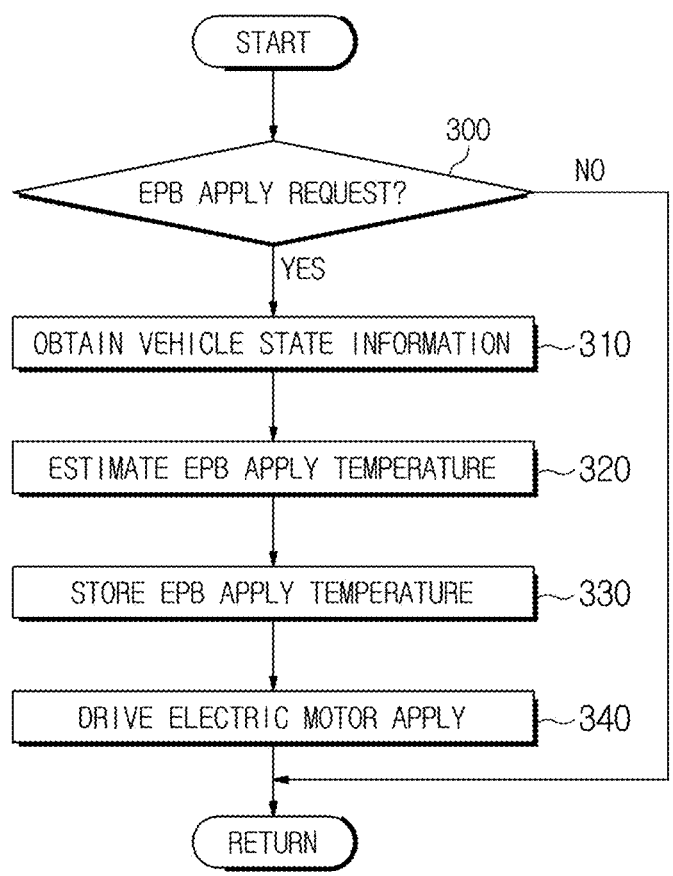

[FIG. 5]
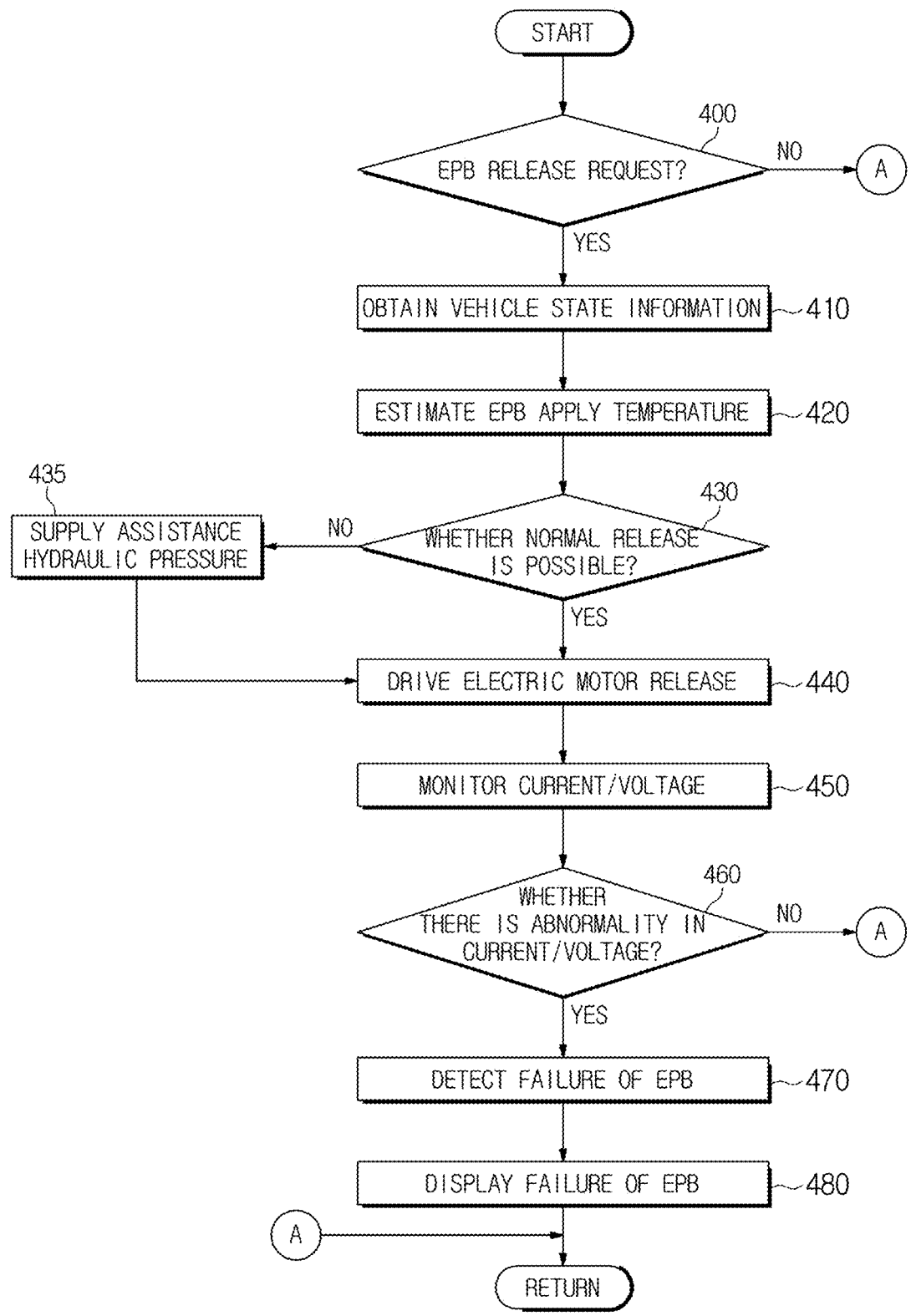

[FIG. 6]
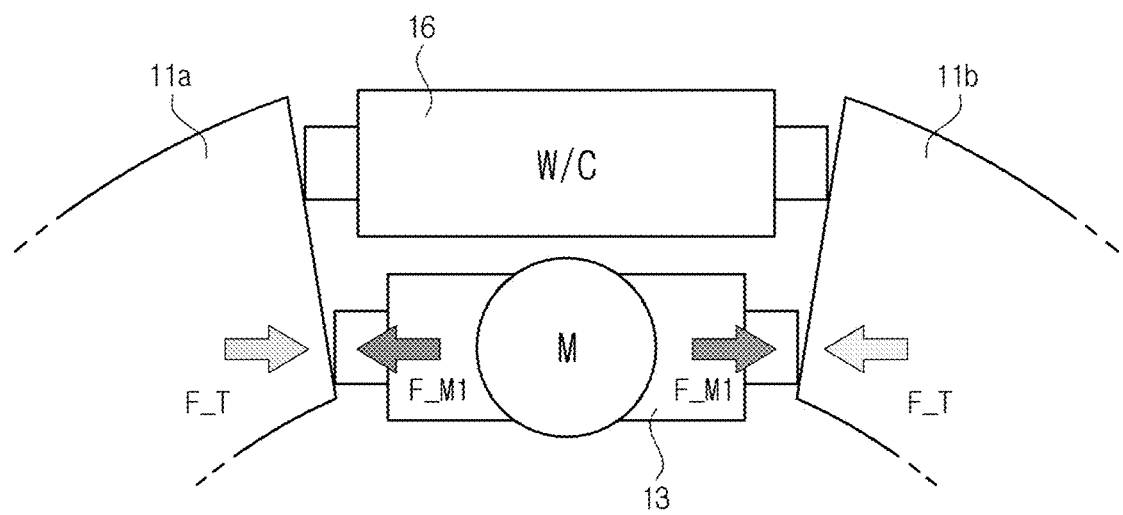

[FIG. 7]
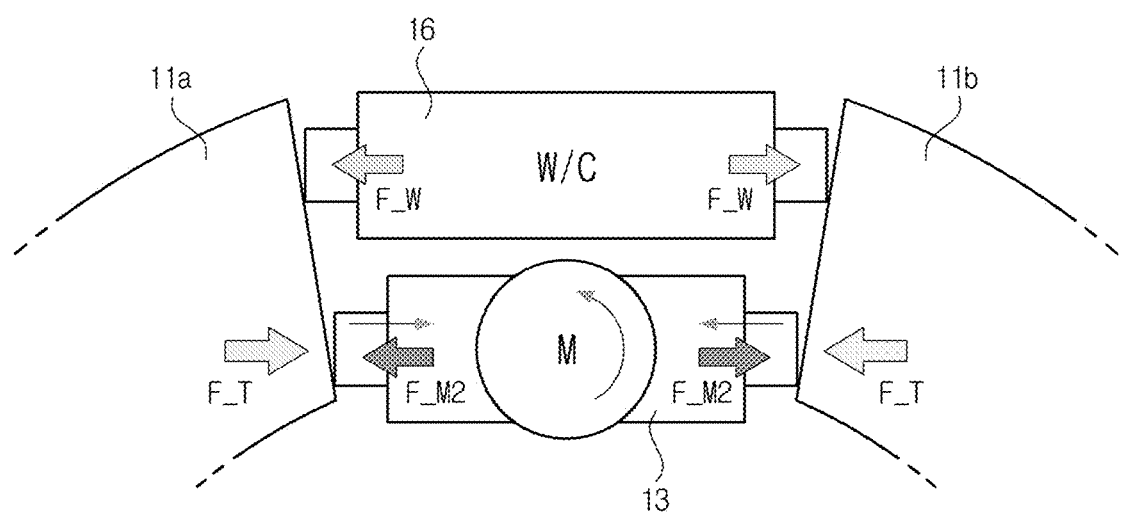

ELECTRONIC PARKING BRAKE SYSTEM AND CONTROL METHOD THEREOF

BACKGROUND

Field of the Invention

The present disclosure relates to an electronic parking brake system and a control method thereof, and more particularly, an electronic parking brake system for determining whether the electronic parking brake is releasable based on a temperature of the parking brake upon a release of the electronic parking brake, and releasing the electronic parking brake through hydraulic assistance if necessary, and a control method thereof

Related Art

In general, an electronic parking brake generates an apply force required for parking via an electric actuator using an electric motor. When the electric motor rotates a spindle member to advance a nut member, the nut members push a piston to bring a brake pad into contact with a brake disk or bring a brake shoe into contact with a brake drum to thereby generate an apply force.

Instead of actuating the electric actuator, the electronic parking brake may generate an apply force by applying a hydraulic pressure to a cylinder provided in the brake and moving the piston to bring the brake pad into contact with the brake disk or by bringing the brake shoe into contact to the brake drum.

In this way, the electronic parking brake may thus be applied by hydraulic pressure or motor drive.

Meanwhile, a temperature of the brake may be increased due to heat generated during travel, and may be reduced as the heat is released after parking is applied. Alternatively, the temperature of the brake may change due to a sudden change in ambient temperature or the like.

If the brake is excessively applied by physical deformation of brake components due to such a change in ambient temperature, problems may occur. For example, the brake may not be released by a torque of the motor itself, and a failure of a motor is detected even when there is no failure in the motor.

SUMMARY

An aspect of the present disclosure provides an electronic parking brake system for inducing release of an electronic parking brake through hydraulic assistance when the electronic parking brake is excessively applied due to with a change in temperature, and a control method thereof.

In an aspect of the present disclosure, there is provided an electronic parking brake system including: an electronic parking brake having an electric motor and a hydraulic cylinder; an ESC actuator configured to generate and supply hydraulic pressure to the hydraulic cylinder; and a controller configured to control the electric motor and the ESC actuator. The controller determines whether or not the electronic parking brake is normally releasable based on the temperature of the electronic parking brake when parking is released, and controls the electric motor to supply hydraulic pressure to the hydraulic cylinder via the ESC actuator and start parking release control when normal release is not possible.

The controller may estimate a change in an apply force of the electronic parking brake based on a temperature of the electronic parking brake upon a parking release and a temperature upon a parking apply, and may determine whether or not a normal release of the electronic parking brake is possible based on the estimated change in the apply force of the electronic parking brake.

The controller may include a memory for storing a temperature of the electronic parking brake upon the parking apply.

The controller may monitor a current or a voltage of the electric motor to determine a failure of the electronic parking brake.

The controller may determine a failure of the electronic parking brake after determining whether the electronic parking brake is normally releasable and determining whether to supply a hydraulic pressure.

The controller may estimate a temperature of the electronic parking brake based on vehicle state information input via a communication interface.

In another aspect of the present disclosure, there is provided a control method of an electronic parking brake system, wherein the electronic parking brake system comprises an electric motor and an electronic parking brake having a hydraulic cylinder, the method including: obtaining a temperature of the electronic parking brake upon a parking release; determining whether the electronic parking brake is normally releasable based on the obtained temperature of the electronic parking brake; supplying a hydraulic pressure to the hydraulic cylinder via an ESC actuator in response to a determination that normal release is not possible; and controlling the electric motor to initiate a parking release.

The determining of whether the electronic parking brake is normally releasable may include estimating a change in an apply force of the electronic parking brake based on a temperature of the electronic parking brake upon the parking release and a temperature of the electrical parking brake upon a parking apply.

The control method may further include storing a temperature of the electronic parking brake upon the parking apply.

The control method may further include monitoring a current or a voltage of the electric motor to determine a failure of the electronic parking brake.

The determining of a failure of the electronic parking brake may be performed after determining whether the electronic parking brake is normally releasable and determining whether to supply a hydraulic pressure.

The obtaining of a temperature of the electronic parking brake may include estimating a temperature of the electronic parking brake based on vehicle state information input via a communication interface.

In an electronic parking brake system and a control method thereof according to the present embodiment, it is possible to prevent an unintended operation of the electronic parking braking system in consideration of a situation depending on temperature.

In the electronic parking brake system and the control method thereof according to this embodiment, it is possible to induce release of the electronic parking brake through hydraulic assistance, thereby preventing erroneous detection of a failure.

BRIEF DESCRIPTION OF THE DRAWINGS

FIG. 1 illustrates an electronic parking brake according to an embodiment of the present disclosure.

FIG. 2 is a diagram illustrating a driving state when an electronic parking brake according to an embodiment of the present disclosure is applied.

FIG. 3 is a block diagram illustrating a schematic configuration of an electronic parking brake system according to an embodiment of the present disclosure.

FIG. 4 is a control flow diagram for EPB apply of an electronic parking brake system according to an embodiment of the present disclosure.

FIG. 5 is a control flow diagram for EPB release of an electronic parking brake system according to an embodiment of the present disclosure.

FIGS. 6 and 7 illustrate a driving state when an electronic parking brake according to an embodiment of the present disclosure is released.

DESCRIPTION OF EXEMPLARY EMBODIMENTS

Like reference numerals refer to like elements throughout. The present specification does not describe all elements of embodiments, and common knowledge in the technical field to which the present invention pertains or the same descriptions of the embodiments will be omitted. The term "unit," "module," "member," or "block" may be implemented by using hardware or software. According to embodiments, one component may be implemented by a plurality of "units," "modules," "members," or "blocks," or one "unit," "module," "member," or "block" may include a plurality of components.

Throughout this specification, when a part is referred to as being "connected" to another part, the two parts may not only be directly connected but may also be indirectly connected, and an indirect connection includes a connection via a wireless communication network.

When a part is referred to as "including" a component, other components are not excluded therefrom and may be further included unless specified otherwise.

Throughout this specification, when a member is referred to as being positioned "on" another member, the member may be in contact with the other member or another member may be interposed between the two members.

The terms "first," "second," etc. are used to distinguish one component from other components, and components are not limited by the terms. An expression in the singular form includes the plural form unless explicitly stated otherwise.

Identification numbers of respective steps are used for convenience of description, and do not describe a sequence of the respective steps. The steps may be carried out in a sequence different from that described unless a particular sequence is specified.

FIG. 1 illustrates an electronic parking brake according to an embodiment of the present disclosure and FIG. 2 illustrates a driving state when an electronic parking brake according to an embodiment of the present disclosure is applied.

Referring to FIG. 1, an electronic parking brake 10 may be an electric drum brake. In the electronic parking brake 10, a drum 12 to be rotated with a wheel is provided inside, and a pair of brake shoes 11a and 11b with brake linings attached thereto expands to brake the drum 12.

The electric drum brake 10 may include the pair of brake shoes 11a and 11b each having an arc-shaped shape and installed to be movable along a surface of a backing plate coupled to a vehicle body, the drum 12 having a friction surface on an inner circumferential side thereof and rotating with a wheel, an electric actuator 13 configured to apply a force to each of the brake shoes 11a and 11b in a direction of expanding the pair of braking shoes 11a and 11b, and a wheel cylinder 16.

In the pair of brake shoes 11a and 11b, one ends facing each other are connected to the electric actuator 13 and the wheel cylinder 16, which are provided on a backing plate. In the pair of brake shoes 11a and 11b, the other side opposite to one side connected to the electric actuator 13 and the wheel cylinder 18 is connected to pins 15a and 16b of an anchor member 14, which are fixed to the backing plate. Accordingly, the brake shoes 11a and 11b do not rotate together with the drum 12.

A strut 17 and a spring 18 are provided between the pair of brake shoes 11a and 11b. The strut 17 serves as an adjuster for adjusting a gap between the pair of brake linings and the friction surface of the drum 12 according to wear of the brake linings. Further, the brake shoes 11a and 11b are fixed to both ends of the spring 18, respectively, and are disposed so that the pair of brake shoes are close to each other.

The electric actuator 13 may include an electric motor M, a speed reducer, and a pressing mechanism including a ball screw mechanism. As shown in FIG. 2, when the electric motor M rotates in one direction, an output shaft rotates, and the rotation of the output shaft is decelerated by the speed reducer. This rotational motion is converted into a linear motion by the ball screw mechanism, and the pair of brake shoes 11a and 11b are pressed in directions away from each other. As a result, the pair of brake shoes 11a and 11b with brake linings presses the drum 12 to generate a braking force. Meanwhile, when the electric motor M rotates in the opposite direction, the pair of brake shoes 11a and 11b pressing the drum 12 and with the brake lining attached thereto are separated from the drum, thereby releasing the braking force.

The wheel cylinder 16, which is a hydraulic cylinder, may apply a force to the pair of brake shoes 11a and 11b by hydraulic pressure being supplied. When the braking hydraulic pressure is supplied from the outside, a piston provided in the hydraulic cylinder moves and the pair of brake shoes 11a and 11b are respectively pressed in directions away from each other. As a result, the pair of brake shoes 11a and 11b with brake linings presses the drum 12, thereby generating a braking force. Meanwhile, when the supply of the hydraulic pressure is cut off, the pair of brake shoes 11a and 11b with brake linings are, while pressing the drum 12, separated from the drum 12, thereby releasing a braking force.

FIG. 1 shows a case where the electric actuator 13 and the wheel cylinder 16 are connected in parallel to each other between the pair of brake shoes 11a and 11b, but, in another embodiment, the electric actuator 13 and the wheel cylinder 16 may be configured as one cylinder and a piston inside the cylinder may be installed so as to move forward and backward by braking hydraulic pressure, so that the piston can move forward and backward even by a pressurization mechanism of the electric actuator.

On the other hand, in another embodiment of the disclosed invention the electronic parking brake may be a disc brake rather than a drum brake as disclosed in FIG. 1. In another embodiment, an electronic parking brake may include a carrier on which a pair of pad plates are provided to be movable back and forth so as to press a brake disk rotating together with a wheel of a vehicle, a caliper housing provided with a cylinder slidably mounted on the carrier and having a piston mounted to be capable of moving forward and backward by braking hydraulic pressure, a power conversion unit for pressing the piston, and an electric actuator for transmitting a rotational force to the power conversion unit using an electric motor M.

With the above-described configuration, the electronic parking brake 10 may be able to press the brake shoes or the brake pad using the electric motor M when the EPB is applied. The electronic parking brake 10 may perform a apply operation that generates a apply force as the brake shoe or brake pad pressed by the electric motor M are brought into contact with the drum or disk.

In addition, in the case of releasing the parking, the electronic parking brake 10 may be released from the pressure by retracting a member pressing the brake shoes or the brake pad using the electric motor M. As the brake shoes or brake pad become to be spaced from the drum or disc by release of the pressing on the brake shoes or brake pad, the electronic parking brake 10 may perform a release operation to releases the generated apply force.

FIG. 3 is a block diagram illustrating a schematic configuration of an electronic parking brake system according to an embodiment of the present disclosure Referring to FIG. 3, the electronic parking brake 10 may be provided at rear left and right wheels RL and RR of the vehicle.

The electronic parking brake system may include a controller 200, an ESC actuator 210, an EPB switch 220, and a current sensor 230.

The controller 200 may be called an Electronic Control Unit (ECU).

The controller 200 may include a processor and a memory. The processor may control the overall operation of the electronic parking brake system. The memory may store programs for processing or control of the processor and various data for operation of the electronic parking brake system. The memory may include a volatile memory such as an S-RAM and a D-RAM, as well as a non-volatile memory, such as a flash memory, a Read Only Memory (ROM), and an Erasable Programmable Read Only memory (EPROM).

The controller 200 may include an ESC control module 201 for controlling the operation of the ESC actuator 210, and an EPB control module 202 for controlling the operation of an electric motor M of the electronic parking brake 10. The ESC control module 201 and the EPB control module 202 may be implemented by software provided in a single integrated ECU, or may be separate ECUs connected to a communication interface.

The controller 200 may estimate a temperature of the electronic parking brake 10 based on vehicle state information which is input via the communication interface. The controller 200 may estimate a temperature of the electronic parking brake 10 based on wheel speed information and brake pressure information, which are input via the communication interface 60.

For example, when a driver of the vehicle presses a brake pedal to reduce the speed during travel of the vehicle, the brake shoes 11a and 11b with the brake lining apply pressure to the drum 12. When a frictional force is generated by contact between the drum 12 and the brake lining, the kinetic energy of the vehicle is converted into frictional energy between the drums 11 and the brake lining. The frictional energy is converted into thermal energy, some of which may escape into the air and be absorbed by the drum 12. The thermal energy absorbed by the drum 12 increases the temperature of the drum. In contrast, while the vehicle is traveling or stopped without braking, the thermal energy absorbed by the drum 12 is released into the surrounding connected components or atmosphere in ways of conduction, convection, and radiation, and thus, the temperature is lowered. This thermal energy conversion process may be used to create a mathematical model that calculates the temperature of the drum 12 and the electronic parking brake 10. The frictional energy generated by the frictional force is converted into thermal energy and absorbed by the drum 12. The thermal energy generated by the friction force may be a function of the friction coefficient of the brake lining, the braking pressure, the wheel speed, etc. Thermal energy, which has been absorbed by drum 12 when the vehicle is traveling without braking or is stopped, is transferred to the surrounding atmosphere or connected components in ways of conduction, convection, radiation, etc. The sum of the thermal energy exiting the drum 12 in ways of conduction, convection and radiation may be calculated by adding all of the respective thermal energy. Depending on a speed of the vehicle, the thermal energy to be cooled may be expressed as a function of wheel speed, ambient temperature, etc. A final temperature of the drum 12 is determined by a difference between thermal energy absorbed for a certain time and thermal energy transferred to the outside. A current temperature of the drum 12 may be determined by a change in temperature due to the difference between the two thermal energies. The temperature of the drum 12 may be continuously calculated while the vehicle travels. In addition, the controller 20 may directly detect a temperature of the drum 12 through a temperature sensor that detects the temperature of the drum 12.

The ESC actuator 210 may supply brake oil pressure to wheel cylinders 16rl and 16rr of electronic parking brakes 10rl and 10rr of rear left and right wheels RL and RR so as to brake the rear left and right wheels RL and RR.

The ESC actuator 210 is connected to a master cylinder MC coupled with a reservoir R, which stores brake oil, via brake pipes.

The ESC actuator 210 is connected to the wheel cylinder 16rl of the electronic parking brake 10rl of the left rear wheel RL, and to the wheel cylinders 16rr of the electronic parking brake 10rr of the right rear wheel RR via the brake pipes.

The ESC actuator 210 may include a master cylinder MC for generating a brake oil pressure by operation of a brake pedal BP, a reservoir R for storing brake oil, an open/close valve for adjusting the brake oil pressure supplied to the wheel cylinders 16rl and 16rr during a braking control, and a hydraulic circuit for supplying the brake oil generated by the master cylinder MC to the wheel cylinders 17rl and 17rr or for generating brake oil using a hydraulic pressure generating device such as a motor pump or a hydraulic piston and supplying the generated brake oil to the wheel cylinders 17rl or 17rr.

The ESC actuator 210 having the above-described configuration generates a braking force required for the wheels, by supplying the brake oil pressure generated in the master cylinder MC to the wheel cylinders 16rl and 16rr by the operation of the brake pedal BP and driving the opening/closing valve as necessary, or by supplying the brake oil pressure generated by the fluid pressure circuit to the wheel cylinders 16rl and 16rr and driving the opening/closing valve as necessary. The brake oil pressure supplied to the wheel cylinders 16rl and 16rr may generate a braking force on the left and right rear wheels RL and RR by pressing the pistons to bring the brake shoes 11a and 21b into close contact with the drum 12.

The EPB switch 220 is a switch for receiving an input of a driver's operation to the electronic parking brake 10, and may be provided in the vicinity of the driver's seat of the vehicle.

The EPB switch 220 is provided to be turned on or off by the driver.

The EPB switch 220 transmits a signal corresponding to an EPB apply command, which is a parking operation command, to the controller 200 in ON operation, and a signal corresponding to an EPB release command, which is a parking release command, in OFF operation.

The controller 200 may perform an EPB apply mode or an EPB release mode in order to apply or release the electronic parking brake 10 in accordance with an operation signal of the EPB switch 220 operated by the driver or an operation signal generated by a program associated with an electronic parking brake operation.

In the EPB apply mode, the controller 200 may perform EPB apply in which the brake shoes 11a and 11b are brought into close contact with the drum 12 by pressing the piston by rotating the electric motor M of the electric actuators 13rl and 13rr in one direction to generate an apply force.

In the EPB release mode, the controller 200 may perform EPB release in which the apply force generated by releasing the brake shoes 11a and 11b closely contacting to the drum 12 is released by releasing the pressure of the piston by rotating the electric motor M of the electric actuators 13lr and 13rr in opposite directions.

The current sensor 230 detects a current flowing through the electric motor M of the electronic parking brakes 10rl and 10r. The current sensor 230 may detect a motor current flowing through the electric motor M using a shunt resistor or a Hall sensor. In the current sensor 230, various methods for sensing a motor current in addition to the shunt resistor or Hall sensor may be applied In the EPB apply mode, the controller 200 may rotate the electric motor M in one direction until a current value reaches a target current value corresponding to an apply force required for parking, and then may stop the motor M to complete an EPB apply operation.

In the EPB release mode, the controller 200 may stop the electric motor M to complete the EPB release operation after a predetermined time has elapsed after the motor M is rotated.

The controller 200 may monitor a current or voltage of the electric motor M to determine a failure of the electronic parking brake 10.

The controller 200 controls to supply an electric current to the electric motor M in the EPB apply mode and in the EPB release mode. At this time, it is possible to monitor the current supplied to the electric motor M or the voltage applied to the motor M and to determine a failure of the electronic parking brake 10 when an abnormal pattern occurs. For example, the controller 200 may determine a failure by setting various conditions as an abnormal pattern, such as conditions in which a current value I_rsh of an in-rush interval in an initial stage of operation is higher than a set current value, there is no in-rush interval, or a time for which a current input to the electric motor M continues to be higher than a set load current I_load becomes longer than a predetermined time.

The controller 200 may include a memory for storing a temperature of the electronic parking brake 10 upon a parking apply.

The controller 200 may supply a hydraulic pressure to the wheel cylinders 16rl and 16rr of the electronic parking brakes 10rl and 10rr through an ESC cooperative control by the ESC actuator 210 before the electric actuator 13 is actuated.

When it is necessary to increase the hydraulic pressure of the wheel cylinders 16rl and 16rr, the controller 200 may generate a brake hydraulic pressure with a hydraulic pressure generating device such as a motor pump and a hydraulic piston of the ESC actuator 210 and supply the brake oil pressure to the wheel cylinders 16rl and 16rr.

As described above, a phenomenon occurs in which an apply force changes due to a physical change such as thermal contraction or thermal expansion of a brake component due to a temperature change. When the electronic parking brake 10 is applied with too great an apply force due to a temperature change, the electronic parking brake 10 may not be properly released due to a lack of torque of the electric motor M upon an EPB release or the apply force may not be sufficiently reduced, thereby resulting in a drag of the vehicle.

For example, the brake actuation during traveling causes a temperature of the brake to increase and the EPB apply is made in with the drum 12 being expanded, thereby fixing the position of the braking shoes 11a 110b. Then, when the drum 12 contracts due to lowering of the temperature, not just the drum 12 and the brake shoes 11a and 11b strongly comes into contact with each other, but also the components of the electric actuator 13 becomes to be tightly engaged with each other. Thus, the electronic parking brake 10 is applied with a greater apply force than in a case where the electronic parking brake 10 is applied without a change in temperature.

As such, a large torque is required to initially drive the electric actuator 13 when the parking is released with the electronic parking brake 10 applied with a large apply force. Due to this, the torque of the motor itself alone may not be released, or may be less released such that a residual apply force remains after the release.

In the disclosed invention, the change in temperature upon EPB apply and EPB release affects the initial drive of the electric actuator 13 upon EPA release, and this may be solved through a hydraulic cooperative control. First, upon an EPB apply, the controller 200 estimates and stores a temperature of the electronic parking brake based on the vehicle state information. Upon an EPB release, the controller 200 determines whether the electronic parking brake is normally releasable or not, based on the temperature of the electronic parking brake estimated based on the vehicle state information and the temperature at the times of EPB apply. When normal release is not possible, the controller 200 requests a hydraulic cooperative control to perform an EPB release control.

The controller 200 may estimate a change in the apply force of the electronic parking brake 10 based on a temperature of the electronic parking brake 10 upon a parking release and a temperature thereof upon a parking apply, and may determine whether or not it is possible to normally release the electronic parking brake 10 based on an estimated apply force thereof.

When it is not determined that the electronic parking brake 10 is normally releasable, the controller 200 may supply a hydraulic pressure via the EPB actuator 210 and initiate a parking release control of the electric motor M.

Therefore, in the disclosed invention, since a required torque of the electric actuator 13 can be reduced through the hydraulic supply when the EPB is released, it is possible to prevent the problems that the electronic parking brake 10 is not released with the torque in the electric motor M itself and that an apply force remains after the release because the electronic parking brake 10 is not properly released. In doing so, the disclosed invention is able to more accurately and reliably perform the EPB release operation.

The disclosed invention makes it possible to reduce the incidence of erroneous control such as less or too much release of the EPB and the resulting effects (overfriction, etc.) in consideration of the effects of temperature changes upon an EPB apply and an EPB release.

The disclosed invention may prevent a false detection of a failure of the motor when the EPB apply is not released by the torque of the engine itself due to a temperature change during the EPB release.

The disclosed invention may increase a product life by reducing the number of cases of control with an excessive torque of the electric actuator 13 when the EPB is released.

FIG. 4 is a control flow diagram for an EPB apply of an electronic parking brake system according to an embodiment of the present disclosure Referring to FIG. 4, the controller 200 determines whether EPB apply is requested in operation 300.

When the EPB apply is requested, the controller 200 first receives vehicle state information through the communication interface in operation 310.

The controller 200 estimates a temperature of the electronic parking brake 10 based on the received vehicle state information in operation 320. This may be the same as the temperature estimating process described above with reference to FIG. 3.

The controller 200 stores the temperature of the electronic parking brake 10 upon a parking apply in operation 330.

Then, the controller 200 initiates and performs an EPB apply in operation 340. When a motor current detected through the current sensor 230 reaches the target current corresponding to the EPB apply after the electric motor M is rotated in one direction, the controller 200 may determine that the EPB apply is completed and may complete the EPB apply operation.

FIG. 5 is a control flow diagram for EPB release of an electronic parking brake system according to an embodiment of the present disclosure.

Referring to FIG. 5, the controller 200 determines whether EPB release is requested in operation 400.

When the EPB release is requested, the controller 200 first receives vehicle state information through a communication interface in operation 410.

The controller 200 estimates a temperature of the electronic parking brake 10 based on the input vehicle state information in operation 420. This may be the same as the temperature estimating process described above with reference to FIG. 3.

The controller 200 determines whether or not the electronic parking brake 10 is normally releasable based on the temperature of the electronic parking brake in operation 430.

The controller 200 may estimate a change in the apply force of the electronic parking brake 10 based on the temperature of the electronic parking brake upon a parking release and the temperature of the electronic parking brake 10 upon a parking apply. The controller 200 may determine whether the electronic parking brake 10 is normally releasable based on the estimated change in the apply force of the electronic parking brake 10.

To this end, controller 200 may retrieve a stored temperature of electronic parking brake 10 upon a parking apply.

When it is determined that normal release is not possible, the controller 200 supplies a hydraulic pressure to the hydraulic cylinder via the ESC actuator 210 in operation 435. As such, the controller 200 may reduce the required torque of the electric actuator 13 by supplying the hydraulic pressure via the ESC actuator 210.

When it is determined that the normal release is possible, or after the hydraulic pressure is supplied to the hydraulic cylinder via the ESC actuator 210, the controller 200 controls the electric motor M to initiate the parking release in operation 440.

The controller 200 monitors a current or voltage of the electric motor 450. The controller 200 determines a failure of the electronic parking brake 10 based on the monitored current or voltage in operation 460.

The controller 200 may determine a failure of the electronic parking brake 10 after determining whether to supply the hydraulic pressure by determining whether normal release is possible. The controller 200 may prevent erroneous detection of a failure by determining a failure of the electronic parking brake 10 after determining whether the hydraulic pressure is supplied. For example, when normal release is not possible with the electric motor M alone but is possible through hydraulic assistance of the ESC actuator 210, the controller 200 may detect a failure after the supply of the hydraulic pressure, so that the electric motor M can operate normally and it is not determined as a failure.

When an abnormality is determined even in a case where a state of the electronic parking brake 10 is determined after determining whether or not to supply the hydraulic pressure, the controller 200 detects a failure of the electronic parking brake 10 in operation 470. When a failure of the electronic parking brake 10 is detected, the controller 200 generates an indication signal 480 for indicating the failure to the driver.

FIGS. 6 and 7 illustrate a driving state when an electronic parking brake according to an embodiment of the present disclosure is released.

Referring to FIG. 6, it can be seen that, in the EPB-applied electronic parking brake 10, the drum 12 is contracting due to a temperature change and is pressing the brake shoes 11a and 11b. As a result of such contraction of the drum 12, the brake shoes 11a and 11b are not only firmly adhered to the drum, but also press (F_T) the electric actuator 13 connected to the brake shoes 11a and 11b. In response to the pressing, the electric actuator 13 forms a reaction force F_M1, and accordingly, the components of the electric actuators 12 are strongly engaged.

As shown in FIG. 6, when the electric actuator 13 is strongly pressed by the brake shoes 11a and 11b, the electronic parking brake 10 may not be released only by a torque of the electric motor M itself.

When it is determined that the electronic parking brake 10 is not normally releasable due to a temperature change, as shown in FIG. 6, the controller 200 generates hydraulic pressure via the ESC actuator 210 and supplies the hydraulic pressure to the wheel cylinder 16.

Referring to FIG. 7, it can be seen that hydraulic pressure is supplied to the wheel cylinder 16 via the ESC actuator 210. The wheel cylinder 16 with the hydraulic pressure supplied presses (F_W) the brake shoes 11a and 11b in directions away from each other. As the wheel cylinder 16 presses the brake shoes 11a and 11b, the reaction force F_M2 formed by the electric actuator 13 is reduced (F_M2<F_M1). Therefore, a force with which the components of the electric actuator 13 are engaged is also reduced, and the EPB release may be performed by rotating the electric motor M. At this time, the controller 200 may release the hydraulic pressure of the wheel cylinder 16 after the EPB release operation is initiated and the electric motor M is initially driven or after the EPB release operation is completed.

As such, in the disclosed invention, upon an EPB release, whether the electronic parking brake is normally releasable is determined based on the temperature of the electronic parking brake 10 before the electric motor M is activated, and when the electronic parking brake is not normally releasable, hydraulic pressure is supplied to reduce a force applied to the electric actuator and then the EPB release operation is performed. Therefore, in the disclosed invention, since a required torque of the electric motor M can be reduced through the hydraulic supply when the EPB is released, and thus, it is possible to perform an EPB release operation more accurately and reliably.

Meanwhile, the aforementioned controller and/or components thereof may include one or more processors/microprocessor(s) coupled with a computer-readable recording medium that stores computer readable code/algorithm/software. The processor/microprocessor(s) may execute the computer-readable code/algorithm/software stored on a computer readable recording medium to perform the functions, operations, steps, etc. described above.

The aforementioned controller and/or components thereof may further include a memory implemented in a non-transitory computer-readable recording medium or a transitory computer readable recording medium. The memory may be controlled by the aforementioned controller and/or components thereof, and may be configured to store data that is transmitted to or received from the aforementioned controller and or components thereof or may be configured to store data which has been processed or is to be processed by the aforementioned controller and/or components thereof.

The disclosed embodiments may also be implemented as computer-readable codes/algorithms/software on a computer readable recording medium. The computer readable recording medium may be a computer-readable non-transitory recording medium such as a data storage device capable of storing data readable by a processor/microprocessor. Examples of the computer-readable recording medium include a hard disk drive (HDD), a solid state drive (SSD), a silicon disc drive (SDD), a read only memory (ROM), a CD-ROM, a magnetic tape, a floppy disk, an optical data storage device, and the like.

The embodiments have been described above with reference to the accompanying drawings. Those of ordinary skill in the art to which the present invention pertains will appreciate that the present invention can be carried out in forms different from the disclosed embodiments without changing the technical spirit or essential characteristics of the present invention. The disclosed embodiments are exemplary and should not be interpreted as restrictive.

What is claimed is:

1. An electronic parking brake system comprising:
   an electronic parking brake having an electric motor and a hydraulic cylinder;
   an ESC actuator configured to generate and supply hydraulic pressure to the hydraulic cylinder; and
   a controller configured to control the electric motor and the ESC actuator,
   wherein the controller determines whether or not the electronic parking brake is normally releasable based on the temperature of the electronic parking brake when parking is released, and controls the electric motor to supply hydraulic pressure to the hydraulic cylinder via the ESC actuator and start parking release control when normal release is not possible,
   wherein the controller estimates a change in an apply force of the electronic parking brake based on a temperature of the electronic parking brake upon a parking release and a temperature of the electronic parking brake upon a parking apply, and determines whether or not a normal release of the electronic parking brake is possible based on the estimated change in the apply force of the electronic parking brake.

2. The electronic parking brake system of claim 1, wherein the controller comprises a memory for storing a temperature of the electronic parking brake upon the parking apply.

3. The electronic parking brake system of claim 1, wherein the controller monitors a current or a voltage of the electric motor to determine a failure of the electronic parking brake.

4. The electronic parking brake system of claim 3, wherein the controller determines a failure of the electronic parking brake after determining whether the electronic parking brake is normally releasable and determining whether to supply a hydraulic pressure.

5. The electronic parking brake system of claim 1, wherein the controller estimates a temperature of the electronic parking brake based on vehicle state information input via a communication interface.

6. A control method of an electronic parking brake system, wherein the electronic parking brake system comprises an electric motor and an electronic parking brake having a hydraulic cylinder, the method comprising:
   obtaining a temperature of the electronic parking brake upon a parking release;
   determining whether the electronic parking brake is normally releasable based on the obtained temperature of the electronic parking brake;
   supplying a hydraulic pressure to the hydraulic cylinder via an ESC actuator in response to a determination that normal release is not possible; and
   controlling the electric motor to initiate a parking release,
   wherein the determining of whether the electronic parking brake is normally releasable comprises estimating a change in an apply force of the electronic parking brake based on a temperature of the electronic parking brake upon the parking release and a temperature of the electrical parking brake upon a parking apply.

7. The control method of claim 6, further comprising:
   storing a temperature of the electronic parking brake upon the parking apply.

8. The control method of claim 6, further comprising:
   monitoring a current or a voltage of the electric motor to determine a failure of the electronic parking brake.

9. The control method of claim 8, wherein the determining of a failure of the electronic parking brake is performed after determining whether the electronic parking brake is normally releasable and determining whether to supply a hydraulic pressure.

10. The control method of claim 6, wherein the obtaining of a temperature of the electronic parking brake comprises estimating a temperature of the electronic parking brake based on vehicle state information input via a communication interface.

* * * * *